United States Patent Office 3,338,982
Patented Aug. 29, 1967

3,338,982
CHLORINATION OF OLEFINS IN THE PRESENCE OF AMIDES
Harry S. Leach and Jerry L. Price, Texas City, Tex., assignors to Monsanto Company, St. Louis, Mo., a corporation of Delaware
No Drawing. Filed Feb. 16, 1965, Ser. No. 433,191
7 Claims. (Cl. 260—660)

The present invention relates to the production of dichloroalkanes, sometimes called olefin dichlorides, by the addition chlorination of olefins. More particularly, it relates to the use of novel catalysts for the addition chlorination of olefins.

The preparation of dichloroalkanes by addition chlorination of olefins by a so-called mixed-phase technique is well known. In a typical operation, a gaseous olefin and gaseous chlorine are usually introduced separately, but at adjacent points, into a body of a liquid reaction medium or contact agent. The reactants are bubbled up through the medium which provides the intimate contact required for reaction and combine to form the desired chlorinated product. Heat liberated by the exothermic reaction is absorbed by the reaction medium which is maintained at the desired temperature level by circulation through external heat exchangers. Preferably, the liquid reaction medium is the reaction product itself, i.e., the dichloroalkane, but any mutual solvent inert to chlorine may be employed.

Various catalysts have been proposed for the process just described. Oxygen and/or air is added to the olefin gas to inhibit the undesired chlorine substitution reaction and increase the yield of the dichloride addition product. Likewise, ferric chloride, iron oxide and certain nitroparaffins have all been employed as suppressants of the substitution reaction to increase the yield of the dichloroalkane and avoid contamination of the product with higher chlorinated compounds. These, in general, provide for satisfactory operations but entail at the same time some disadvantages so that there remains room for further improvements in the process.

Accordingly, it is an object of the present invention to provide an improved method for the addition chlorination of olefins whereby the yield of dichloroalkanes is increased. It is a specific object of the invention to provide an improved method for the addition chlorination of ethylene whereby the yield of dichloroethane is increased and the purity of the product is enhanced.

These and other objects and advantages of the invention which will become apparent from a consideration of the following specification are attained by reacting a gaseous olefin having from two to five carbon atoms and chlorine in a liquid body of a mutual solvent inert to chlorine and in the presence of a minor amount of an amide of the formula RCONRR wherein each R may be hydrogen or an alkyl radical having from one to four carbon atoms. Compounds having this formula include, for example, formamide, methylformamide, dimethylformamide, acetamide, ethylacetamide, methylethylacetamide, propionamide, dimethylpropionamide, butyramide, dimethylbutyramide, and the like. The amides in catalytic amounts in addition to significantly increasing the yield of the dichloroalkane, inhibit the formation of certain chlorinated products usually produced during the induction period which prevails with other catalysts present thus giving a purer product. Further, they are easy to handle and add to the reactor, create no storage problems, and have an immediate effect on the reaction eliminating the usual induction period characteristic of the art processes. Also, they can be used, if desired, together with oxygen to increase the effectiveness of this prior art catalyst.

According to the invention, an amide of the formula recited above is blended with a gaseous ethylene stream which is introduced simultaneously with a gaseous chlorine stream into a liquid reaction medium, preferably a liquid body of the dichloroalkane formed in the reaction, with appropriate cooling to maintain the reaction mixture at the proper temperature level. Alternatively, the amide catalyst is added directly to the liquid reaction medium in the reaction zone or reactor. The amount of amide catalyst required is small. Generally, amounts from about 0.001 to about 5 mole percent are employed with those in the range from 0.001 to about 1.5 mole percent being preferred.

As observed previously, the liquid reaction medium can be any mutual solvent inert to chlorine such as chloroform, carbon tetrachloride, carbon disulfide, tetrachloroethane, or mixtures of chlorinated solvents such as trichloro- and tetrachlorobutane or propane, and the like. Preferably, however, the dichloroalkane which is the desired product of the reaction is employed as the reaction medium.

The temperature at which the reaction is carried out may be any temperature at which the liquid reaction medium into which the olefin and chlorine are fed remains in the liquid phase under the pressure conditions employed. Suitable temperatures when the dichloroalkane is employed as the reaction medium, for example, are those from about 0° to about 100° C. Preferred temperatures for the chlorination of ethylene, for example, are those from about 20° to about 80° C. Pressures are not critical. Any desired pressure at which the reaction medium into which the reactants are introduced is maintained in the liquid phase is suitable. In general, pressures from atmospheric up to about 250 p.s.i.g. can be employed. At the preferred temperature conditions for chlorinating ethylene, for instance, pressures from about 15 to about 50 p.s.i.g. are preferred.

While the stoichiometric proportions of olefin to chlorine can be employed, the olefin is preferably supplied in an excess of that required to react with the chlorine. Such excess, however, is preferably only slight with reactant proportions of olefin to chlorine from about 1.05:1 to about 2:1 being preferred.

The process of the invention can be carried out in any suitable equipment such as, for example, a liquid-filled tower provided with diffusion cups to bring the gases in small bubbles in contact with the liquid phase or a packed tower containing rather small packing. Either one stage or a plurality of stages can be employed. Temperature control is facilitated by the use of stage operations. Material of construction reasonably resistant to corrosion by the reactants and reaction products such as steel is employed for fabrication of the apparatus or process equipment.

The invention is illustrated in the following examples which, however, are not to be construed as limiting it in any manner whatsoever.

Example 1

A series of runs in which ethylene was reacted with chlorine was conducted in a water-jacketed vertical glass reactor 14" long and 4" in outside diameter equipped with a thermowell and stirrer. The reactor was charged with about 200 ml. of pure liquid dichloroethane. Ethylene and chlorine were fed through separate gas inlet tubes into a Teflon mixing nozzle positioned in the bottom of the reactor and bubbled up through the body of the liquid in the reactor. Temperature was maintained at about 25° C. by circulating cold water in the jacket. Pressure was atmospheric. The product condensed as it was produced and a liquid draw-off of dichloroethane was provided for its recovery from the reactor. In one run, only ethylene and chlorine were introduced into the reactor. In another, 0.5 mole percent oxygen was mixed with the ethylene after the manner of the prior art. In others, dimethylformamide was vaporized and blended with the ethylene feed which was then charged to the reactor, or a small amount of dimethylformamide was added directly to the dichloroethane liquid in the reactor. Several runs were made in which both oxygen and dimethylformamide were present. In these runs, the concentration of oxygen in the ethylene feed was 0.5 mole percent and the dimethylformamide was added either in the ethylene feed or to the reaction medium as in the runs with dimethylformamide alone.

Yields were determined on the basis of HCl and $Cl_2$ in the reactor off-gas. Periodically during a run, the off-gas was bubbled through a potassium iodide solution and then analyzed by iodometric titration. Chromatographic analyses of the dichloroethane product were also employed. Results which are reported in Table I below are those obtained after the run had "lined out," i.e., consecutive yield determinations checked each other.

TABLE I

| Run No. | Catalyst | DMF* Catalyst Conc., Mole Percent | Yield, Percent |
|---|---|---|---|
| 1 | None | 0 | 79.9 |
| 2 | $O_2$ | 0 | 95 |
| 3 | DMF | 0.030 | 98 |
| 4 | DMF | 0.0135 | 96.7 |
| 5 | DMF and $O_2$ | 0.00135 | 99.7 |
| 6 | DMF and $O_2$ | 0.0135 | 99.8 |
| 7 | DMF and $O_2$ | 0.3375 | 100 |
| 8 | DMF and $O_2$ | 1.35 | 99.9 |

* Dimethylformamide.

*Example 2*

A run comparable to Run 6 in Table I was made in order to compare the purity of the chlorinated product made using ferric chloride, a catalyst taught in the art, with that of the product obtained using the process of the invention. The procedure employed was the same as that described in Example 1. The ethylene feed contained 0.5 mole percent oxygen and 0.021 mole percent ferric chloride was added directly to the reactor. Analyses of the products were made by gas chromatographic means. Compounds present in addition to the desired dichloroethane in the product from each run are recorded in Table II below. The quantities given are in parts per million parts of the recovered product.

TABLE II

| Run No. | 6 | 9 |
|---|---|---|
| Catalyst | DMF | $FeCl_3$ |
| Ethyl Chloride | <10 | 177 |
| Chlorobenzene | <50 | 413 |
| Bis (2-chloroethylether) | <50 | 274 |

The foregoing data clearly demonstrate that dimethylformamide actively catalyzes the addition chlorination of ethylene to dichloroethane. Not only is the catalyst useful by itself, but when used with oxygen, a widely used prior art catalyst, it enhances considerably the effect of the latter in the reaction. Moreover, the use of the catalyst of the invention results in the production of a purer product than can be obtained with ferric chloride, another catalyst representative of the prior art.

While the invention has been exemplified by the chlorination of ethylene to produce dichloroethane, it is to be understood that the process disclosed herein is not limited to the chlorination of this olefin. Similar results are obtained in the chlorination of propylene to propylene dichloride and butylene and amylene to the corresponding dichlorides using dimethylformamide and the other amides disclosed above as catalysts. When producing these other olefin dichlorides, the desired reaction product is preferably employed as the liquid reaction medium.

What is claimed is:
1. The process of preparing a dichloroalkane which comprises reacting a gaseous olefin having from two to five carbon atoms with gaseous chlorine in a liquid body of the dichloroalkane produced in the reaction and in the presence of a catalytic amount of an amide of the formula RCONRR wherein each R is selected from the group consisting of hydrogen and alkyl radicals having from one to four carbons atoms.

2. The process of claim 1 wherein the amount of said amide is from about 0.001 mole percent to about 5 mole percent.

3. The process of preparing dichloroethane which comprises reacting gaseous ethylene with gaseous chlorine in a liquid body of dichloroethane in the presence of a catalytic amount of an amide of the formula RCONRR wherein each R is selected from the group consisting of hydrogen and alkyl radicals having from one to four carbon atoms.

4. The process of claim 3 wherein the amount of said amide employed is in the range from about 0.001 mole percent to about 5 mole percent.

5. The process of preparing dichloroethane which comprises reacting gaseous ethylene with gaseous chlorine in liquid dichloroethane and in the presence of from about 0.001 mole percent to about 1.5 moles percent of dimethylformamide.

6. The process of preparing dichloroethane which comprises reacting gaseous ethylene containing admixed therewith from about 0.001 mole percent to about 1.5 moles percent of dimethylformamide with gaseous chlorine in liquid dichloroethane.

7. The process of preparing dichloroethane which comprises reacting gaseous ethylene with gaseous chlorine in liquid dichloroethane containing from about 0.001 mole percent to about 1.5 moles percent of dimethylformamide.

References Cited

UNITED STATES PATENTS

| | | | |
|---|---|---|---|
| 1,952,122 | 3/1934 | Deanesly | 260—660 |
| 2,323,227 | 6/1943 | Levine et al. | 260—660 |
| 2,393,367 | 1/1946 | Hammond | 260—660 |
| 2,601,322 | 6/1952 | Reese | 260—660 |
| 2,929,852 | 3/1960 | Benedict | 260—660 |

LEON ZITVER, *Primary Examiner.*

K. V. ROCKEY, *Assistant Examiner.*